(12) United States Patent
Trugman et al.

(10) Patent No.: US 8,959,051 B2
(45) Date of Patent: Feb. 17, 2015

(54) OFFLOADING COLLECTION OF APPLICATION MONITORING DATA

(75) Inventors: Rodney M. Trugman, Alpharetta, GA (US); Brian Austin DeWyer, Alpharetta, GA (US)

(73) Assignee: RTIP, Inc., Alpharetta, GA (US)

( * ) Notice: Subject to any disclaimer, the term of this patent is extended or adjusted under 35 U.S.C. 154(b) by 0 days.

(21) Appl. No.: 13/527,853

(22) Filed: Jun. 20, 2012

(65) Prior Publication Data

US 2013/0346367 A1 Dec. 26, 2013

(51) Int. Cl.
*G06F 17/30* (2006.01)
(52) U.S. Cl.
USPC .......................................... 707/613; 707/603
(58) Field of Classification Search
CPC ............. G06F 19/28; G06F 17/30563; G06F 2201/87; G06F 2201/875; G06F 2201/88
USPC .................................. 707/702, 736, 613, 603
See application file for complete search history.

(56) References Cited

U.S. PATENT DOCUMENTS

| | | | | |
|---|---|---|---|---|
| 7,493,302 | B2 * | 2/2009 | Emuchay et al. | 1/1 |
| 7,506,047 | B2 * | 3/2009 | Wiles, Jr. | 709/224 |
| 7,734,637 | B2 * | 6/2010 | Greifeneder et al. | 707/758 |
| 7,792,948 | B2 * | 9/2010 | Zhao et al. | 709/224 |
| 7,925,747 | B2 * | 4/2011 | Kirwan et al. | 709/224 |
| 7,941,457 | B2 * | 5/2011 | Pfeiffer et al. | 707/802 |
| 2002/0077711 | A1 * | 6/2002 | Nixon et al. | 700/51 |
| 2004/0111425 | A1 * | 6/2004 | Greifeneder et al. | 707/100 |
| 2005/0138081 | A1 * | 6/2005 | Alshab et al. | 707/200 |
| 2006/0117059 | A1 * | 6/2006 | Freeman et al. | 707/102 |
| 2006/0195569 | A1 * | 8/2006 | Barker | 709/224 |
| 2009/0063509 | A1 * | 3/2009 | Lockhart et al. | 707/10 |
| 2013/0290476 | A1 * | 10/2013 | Trugman | 709/217 |

* cited by examiner

*Primary Examiner* — Debbie Le (57) ABSTRACT

Systems and methods are disclosed for offloading collection of monitored data. A data collector is associated with a plurality of monitored data sources and with a plurality of monitored data recipients. The data collector collects a cycle of monitored data from each of the sources of monitored data and persistently stores each of the cycles of monitored data in a separate monitored data package. The data collector provides the monitored data packages to the associated monitored data recipients in a manner that is asynchronous to the collection of the monitored data.

20 Claims, 6 Drawing Sheets

OFFLOADING COLLECTION OF APPLICATION MONITORING DATA

CROSS REFERENCE TO RELATED APPLICATIONS

Not applicable.

TECHNICAL FIELD

The present disclosure generally relates to enterprise content management systems, and more specifically to the collection of data that is generated by monitoring components of an enterprise content management system.

BACKGROUND

Today, enterprises such as businesses, governments, educational institutions, and various other organizations use vast amounts of data to drive decision making in their organization. Enterprises use many varieties of computerized information systems and a large amount of networking infrastructure to manage and organize the structured, semi-structured, and unstructured data used by the enterprise. As the number of systems and the amount of data continues to grow, keeping these systems running at an acceptable level of availability and performance becomes more of a challenge.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications, and equivalents included within the spirit and scope of the disclosure as defined by the appended claims.

DETAILED DESCRIPTION

Figure 1:
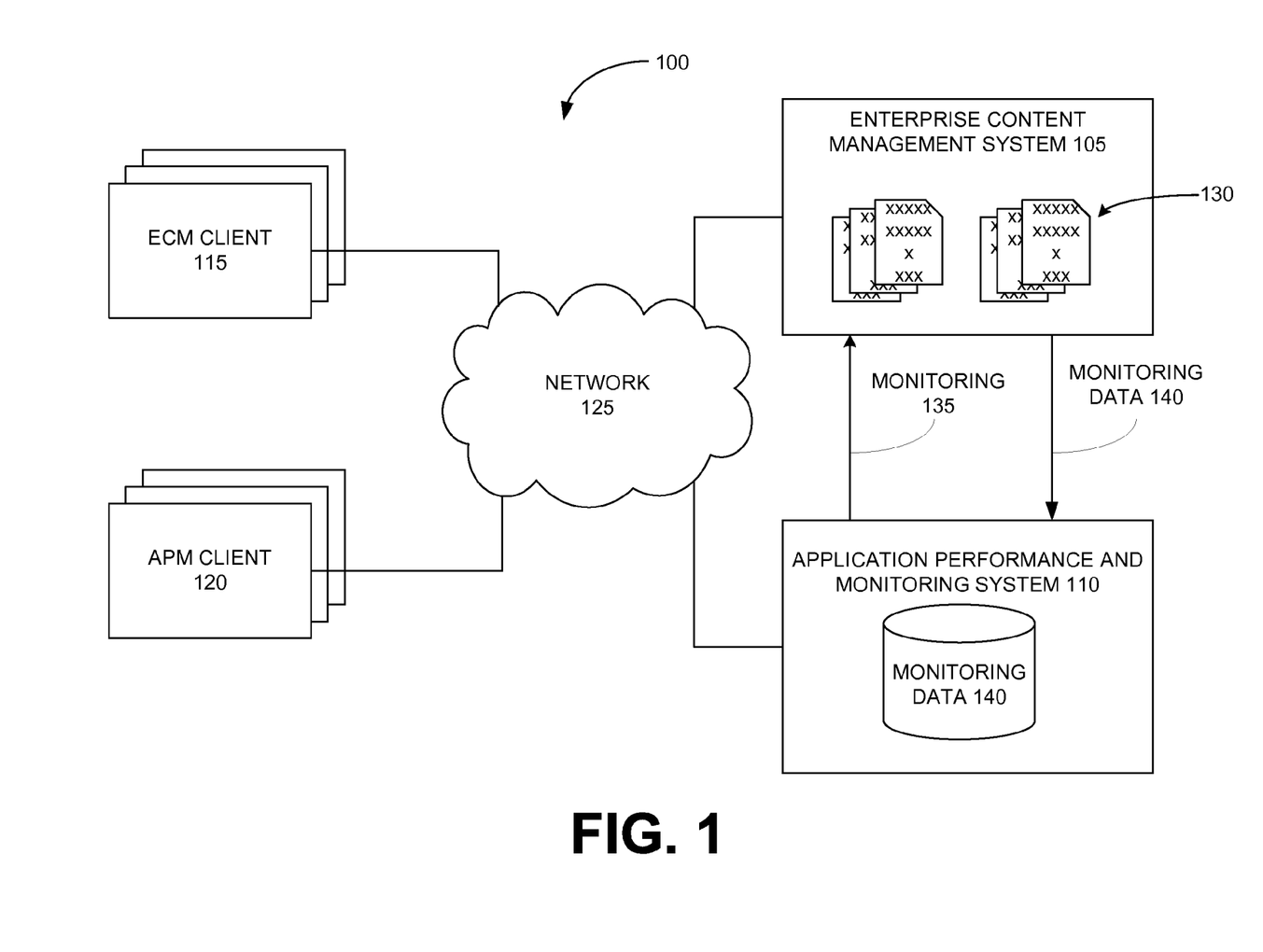
FIG. 1 is a high-level block diagram of a networked environment including an application performance monitoring (APM) system, according to some embodiments disclosed herein.

FIG. 1 is a high-level block diagram of a networked environment. The environment 100 includes an enterprise content management (ECM) system 105, an application performance monitoring (APM) system 110, one or more ECM clients 115, and one or more APM clients 120. These components communicate with each other via a network 125 such as the Internet. In implementations in which network 125 corresponds to the Internet, the components of FIG. 1 may be connected to the Internet using various technologies, such as local area networks (LANs), wide area networks (WANs), wired networks, wireless networks, and combinations thereof. However, such details are not shown. In other implementations, network 125 corresponds to an intranet or extranet rather than to the Internet.

ECM system 105 provides various computing services associated with enterprise content 130 and/or documents that are related to the organizational processes of an enterprise, such as capturing, managing, storing, preserving, and/or delivering the content and documents to various users. Users associated with the enterprise interact with ECM system 105 through various ECM clients 115. For example, a user may, through ECM client 115, view or check out documents, collaborate and share documents with other users. As another example, a user may interact with ECM client 115 to run a workflow application which leads a user through various forms necessary to complete a business task.

ECM system 105 may include components that are specific to or customized for a particular enterprise. A non-limiting list of technologies used to implement ECM system 105 includes EMC Captiva InputAccel®, EMC Documentum®, IBM FileNet®, IBM Content Manager®, Kofax Capture, Microsoft SharePoint®, VMWare vSphere, or combinations thereof. The techniques disclosed herein also apply to other enterprise content management systems.

Application Performance Monitoring (APM) system 110 provides computing services that monitor the behavior and health of software and hardware components of ECM system 105. The monitoring actions 135 performed by APM system 110 produce monitored data 140. Monitored data 140 may include metrics that are related to component performance and that are made available by the ECM system components (e.g., number of file accesses, queue sizes, response time for particular transactions, web site accesses, etc.) Monitored data 140 may also represent the presence or absence of particular resources such as files, directories, etc. In some scenarios, monitored data 140 is produced when APM system 110 executes tests designed to exercise the ECM system components.

After collecting monitored data 140, APM system 110 may provide monitored data 140 through various mechanisms, and in various forms, to enterprise personnel such as managers, decision-makers, or system administrators. These users interact with APM system 110 through one or more APM clients 145. For example, APM system 110 may generate and provide to users a dashboard display of monitored data 140 generated by the monitored ECM system 105. APM system 110 may allow users to generate reports related to monitored data 140 and to configure alerts and alarms which are triggered when indicated by monitored data 140.

Figure 2:
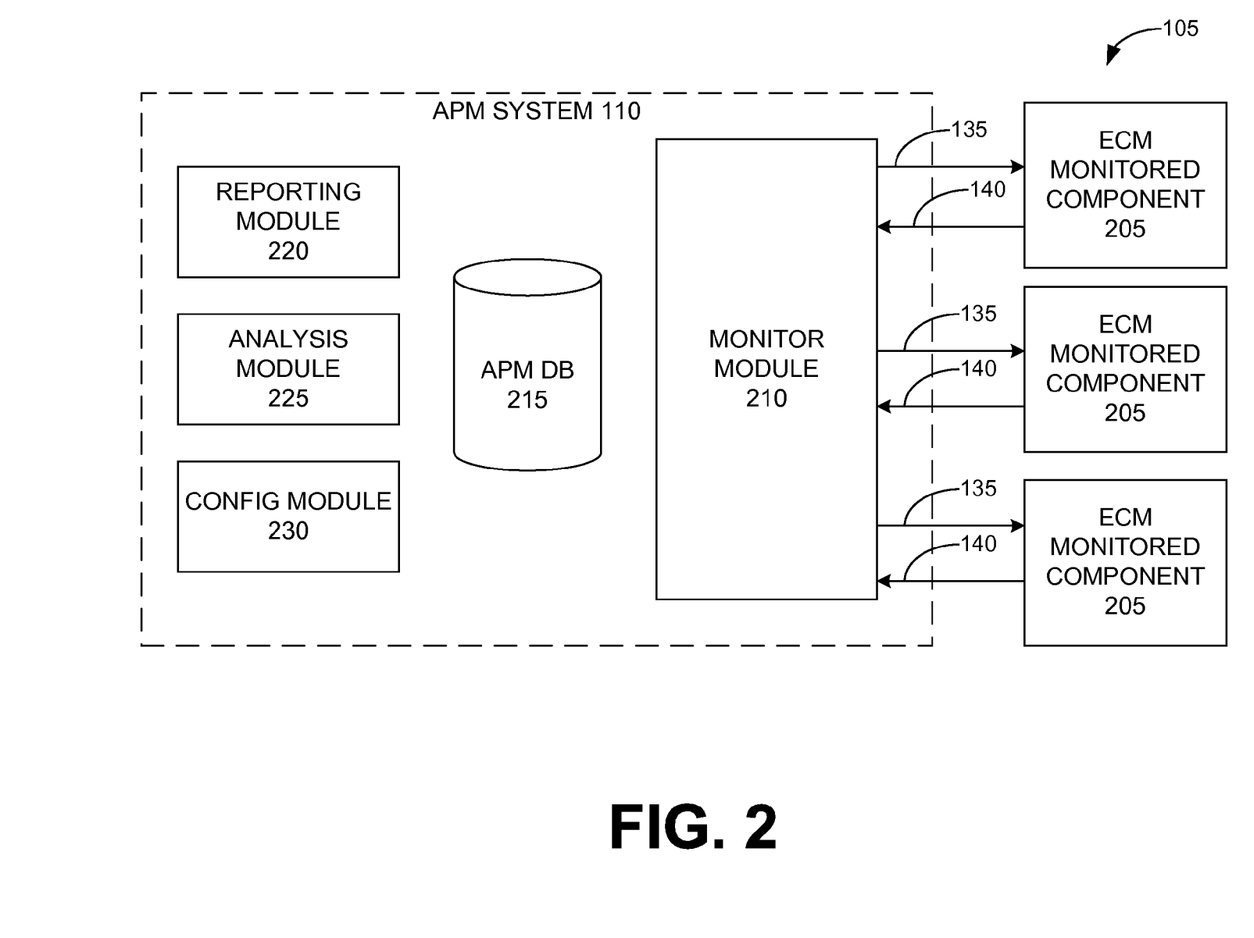
FIG. 2 is a block diagram of the APM system of FIG. 1, according to some embodiments disclosed herein.

FIG. 2 is another block diagram illustrating selected components of the environment 100 from FIG. 1. While FIG. 1 depicted the environment as a whole at a high level, FIG. 2 instead illustrates some of the components of ECM system 105 and APM system 110 in more detail.

In the example configuration shown in FIG. 2, ECM system 105 includes one or more ECM components 205 that combine to provide the overall functionality of the ECM system 105. The ECM components 205 may include web servers that serve up enterprise content 130 (FIG. 1) to various ECM clients 115 (FIG. 1) and application servers that host various services or granular components that support the overall functionality of the ECM system 105. A non-limiting list of services which may be hosted by an application server includes search indexing, application discovery, and load balancing. Some ECM components 205 may be part of the ECM platform itself, while others may be provided by a third party to extend the functionality of ECM system 105. The services hosted by ECM components 205 may be implemented using a variety of middleware frameworks, such as Sharepoint® Service Application Framework, Windows Communication Foundation (WCF), service-oriented architecture (SOAP), representational state transfer (REST), remote procedure calls (RPC), and combinations thereof.

As used with APM system 110, these ECM components 205 are monitored by the APM system 110. As such, each one is thus considered a monitored component 205. That is, a monitor module 210 in APM system 110 performs monitoring actions 135 on the monitored components 205, causing the components to produce monitored data 140. Monitoring actions 135 performed by monitor module 210 may be implemented as application programming interface (API) calls or database queries. Monitoring actions 135 may also be implemented using scripts, for example, Active Server Pages (ASP) scripts, JavaScript, etc.

Monitored data 140 is collected by monitor module 210 and stored in an APM database 215. In some embodiments, the collected monitored data 140 may be filtered and/or transformed before storage in APM database 215. For example, the collected monitored data 140 may be expressed in XML while APM database 215 uses a binary record format.

In addition to monitor module 210, other components of APM system 110 may include a reporting module 220, an analysis module 225, and a configuration module 230. Reporting module 220 communicates monitored data 140 to enterprise users such as managers and decision-makers by generating various reports. In some embodiments, reporting module 220 determines whether monitored data 140 indicates that a service level violation has occurred, and proactively takes remedial action when a service level violation is detected. Analysis module 225 facilitates the generation of reports by analyzing monitored data 140. Configuration module 230 configures the various components APM system 110. In particular, configuration module 230 is used to define the monitored components 205 from which monitored data 140 is collected, the recipients of monitored data 140, and the timing of the collection of the data.

Figure 3:
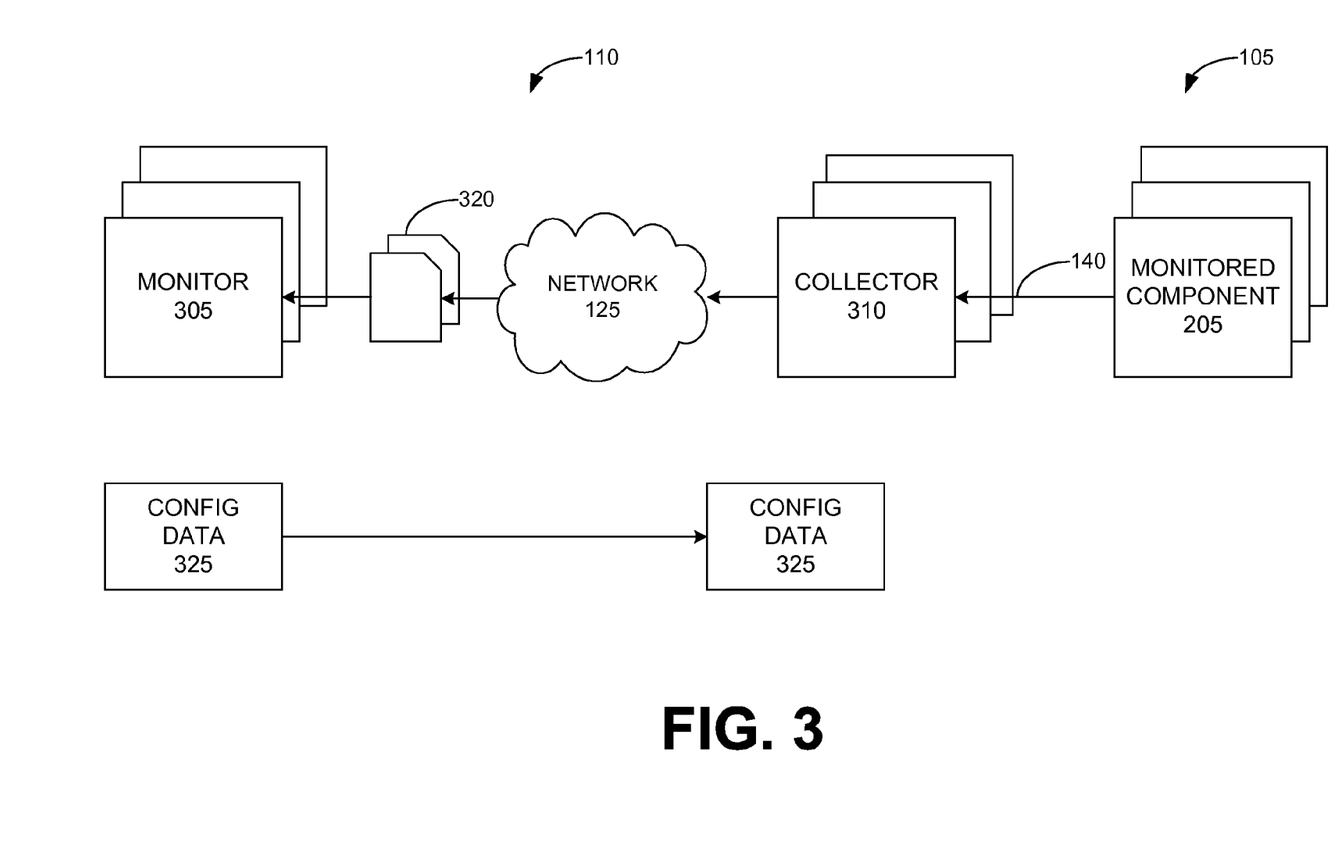
FIG. 3 is another block diagram illustrating selected components from FIG. 2 in further detail, according to some embodiments disclosed herein.

The operation of monitor module 210 and its interaction with monitored components 205 will now be discussed in further detail in connection with the block diagram of FIG. 3. As shown in FIG. 3, monitor module 210 includes at least one monitor 305 and at least one collector 310. In some embodiments, monitor 305 and collector 310 are executed as separate processes. Each monitor 305 obtains monitored data 140 from a monitored component 205. The particular monitored data 140 produced by each monitored component 205 is configurable. Asynchronously to the generation of monitored data 140, collector 310 performs a collection cycle in which monitored data 140 generated by the monitored component 205 is obtained.

As can be seen in FIG. 3, a monitored component 205 can serve as a source of monitored data 315 for collector 310. Notably the association between a source of monitored data 140 and a collector 310 is configurable. Thus, each collector 310 examines configuration data to determine which source of monitored data(s) 315 to collect monitored data 140 from. In some embodiments, collector 310 is implemented as a service rather than an application program, and starts a separate process for each source of monitored data 315. Collector 310 may then individually start and stop each source of monitored data 315.

As explained above, collector 310 obtains monitored data 140 in cycles. The period of the cycle associated with a particular source of monitored data 315 or monitored component 205 is configurable. As each cycle completes, collector 310 persistently stores the collected monitored data 140 in a monitored data package 320 that is specific to the source of monitored data 315. In some embodiments, collector 310 stores the data in a structured data format such as eXtensible Markup Language (XML). In some embodiments, collector 310 maintains the connection to a source of monitored data 315 by remaining logged in between collection cycles.

Notably, a new monitored data package 320 is generated with each collection cycle. The name of the monitored data package 320 may indicate the source, user name, category of data collected, etc. In some embodiments, monitored data package 320 takes the form of an eXtensible Markup Language (XML) file. In addition to collected monitored data, a monitored data package 320 may also include data type, time of collection, error message(s), etc.

Once created, monitored data packages 320 are made available to one or more data recipients. The set of monitored data recipient(s) associated with a particular collector 310 is configurable, for example, through configuration module 230. In some scenarios, the recipient of monitored data 140 is the monitor 305 that caused the monitored data 140 to be generated.

Collector 310 may use a variety of mechanisms to transfer a monitored data package 320 to a recipient. In a scenario in which the recipient and collector 310 execute on the same computer or are on the same network, the recipient may simply access the monitored data package 320 as a file. In a scenario in which the recipient and collector 310 are on different networks, separated by a firewall, collector 310 may use a web service to transfer the monitored data package 320 to the recipient. In some embodiments, a monitored data package 320 may be encrypted and/or compressed before transfer.

The associations between a collector 310 and one or more monitoring data sources 315, as well as the information describing these monitoring data sources 315, is configurable through configuration data 325. In some embodiments where collector 310 is located remotely from monitor 305, master configuration data 325 is stored with monitor 305 and a local copy of configuration data 325 is stored with collector 310. With each collection cycle, collector 310 may first determine if the local copy of configuration data 325 is out of date with respect to the master configuration data 325. If the local copy of configuration data 325 is determined to be out of date, collector 310 updates the local copy from the master, and restarts so that the newer settings take effect. This allows collector 310 to be centrally administered but remotely configured.

Some embodiments of APM system 110 distinguish between various categories of monitored data 140. In such embodiments, each category of monitored data is managed by a data adapter, and each data adapter interacts with a monitored component 205 to obtain monitored data 140 in a particular category. A non-limiting list of categories of monitored data 140 includes Captiva-specific data, Documentum-specific data, event log data, file access data, folder access data, log file search data, performance monitor data, and Windows Management Interface (WMI®) data.

For example, in an environment where a particular monitored component 205 produces event log data and file access data, an event-log data adapter interacts with the monitored component 205 to retrieve the event log data while a file-access data adapter interacts with the same monitored components 205 to retrieve the file access data. If, in the same environment, a monitored component 205 produces data specific to a particular ECM (e.g., data specific to Kofax Capture), then an ECM-specific data adapter interacts with the monitored components 205 to retrieve the ECM-specific data. Collector 310 then retrieves some monitored data 140 from one of the data adapters, and other monitored data 140 from another data adapter.

In embodiments which support category-specific collection of monitored data 140, a monitored data package 320 may be specific not only to a source of monitored data 315 but also to a monitored data category.

Figure 4:
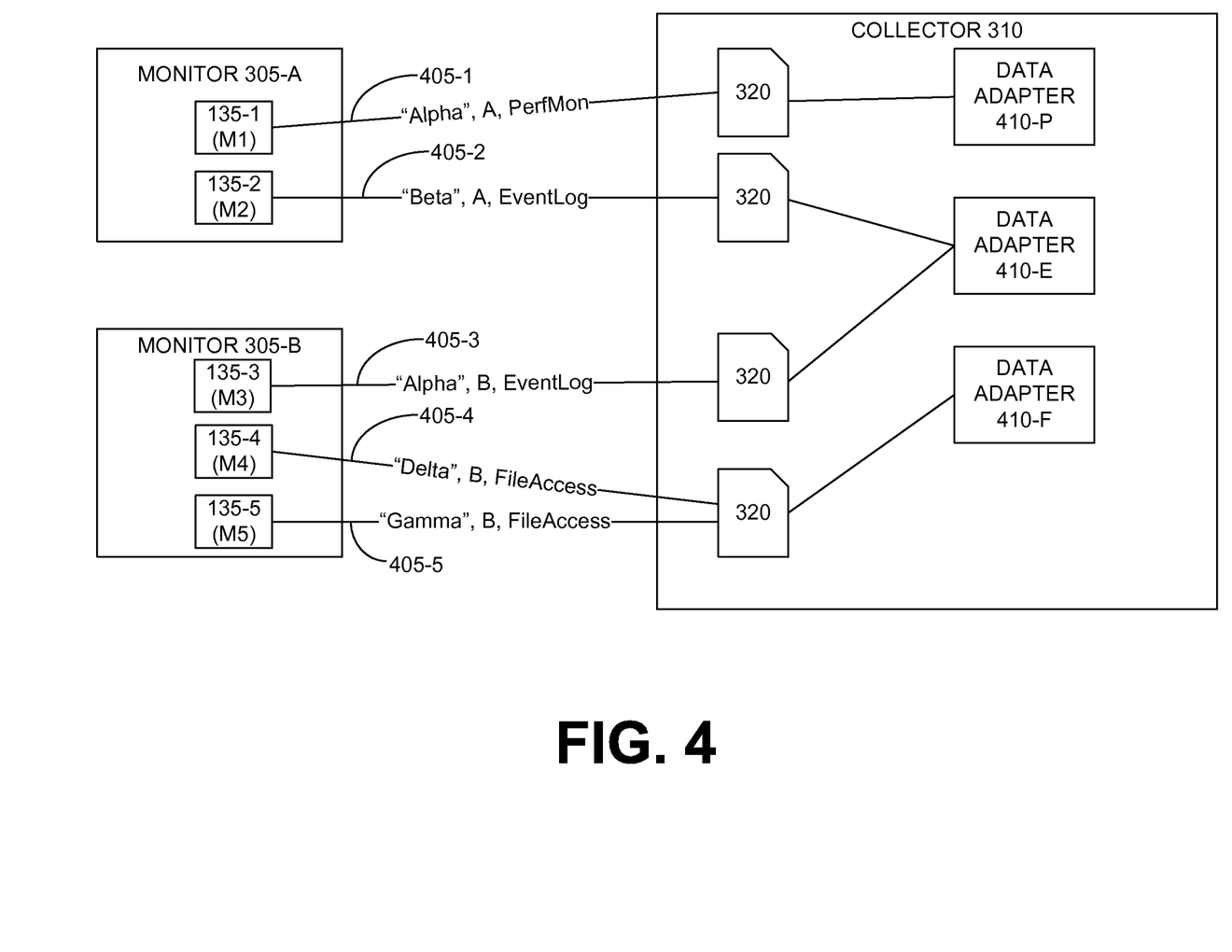
FIG. 4 is a diagram illustrating associations between selected components from FIG. 2, according to some embodiments disclosed herein.

FIG. 4 is a diagram illustrating associations between various components shown in FIG. 3 in an example scenario. FIG. 4 also illustrates category-specific collection of monitored data 140.

In this example scenario, APM system 110 includes two monitors, 305-A and 305-B. Each monitor is shown executing three monitoring actions 135, for a total of six monitoring actions 135-1 . . . 6 (T1-T6), at six different monitored components. In some embodiments, each monitor 305 is implemented using a separate Microsoft Internet Information Server (IIS).

APM system 110 also includes one collector 310. Collector 310 includes five associations, 405A to 405-E. Each association 405 includes: identifying information about the source of monitored data 315 (e.g., the monitored component); identifying information about the recipient of the collected monitored data 140 (e.g., the monitor); and the category of monitored data 140 being collected. Thus, in this example, association 405-A ("Alpha", A, PerfMon) indicates that the source of the data is a monitored component identified as "Alpha", that the collected monitored data 140 is to be sent to Monitor A, and that the data being collected is Performance Monitor data.

As can be seen in FIG. 4, each collector association 405 produces a monitored data package 320. Thus, in this example, association 405-A produces a package that includes Performance Monitor data that is generated by Monitor A from data produced by component "Alpha." FIG. 4 also shows that each category of monitored data 140 is handled by a data adapter 410P, E, F.

Figure 5:
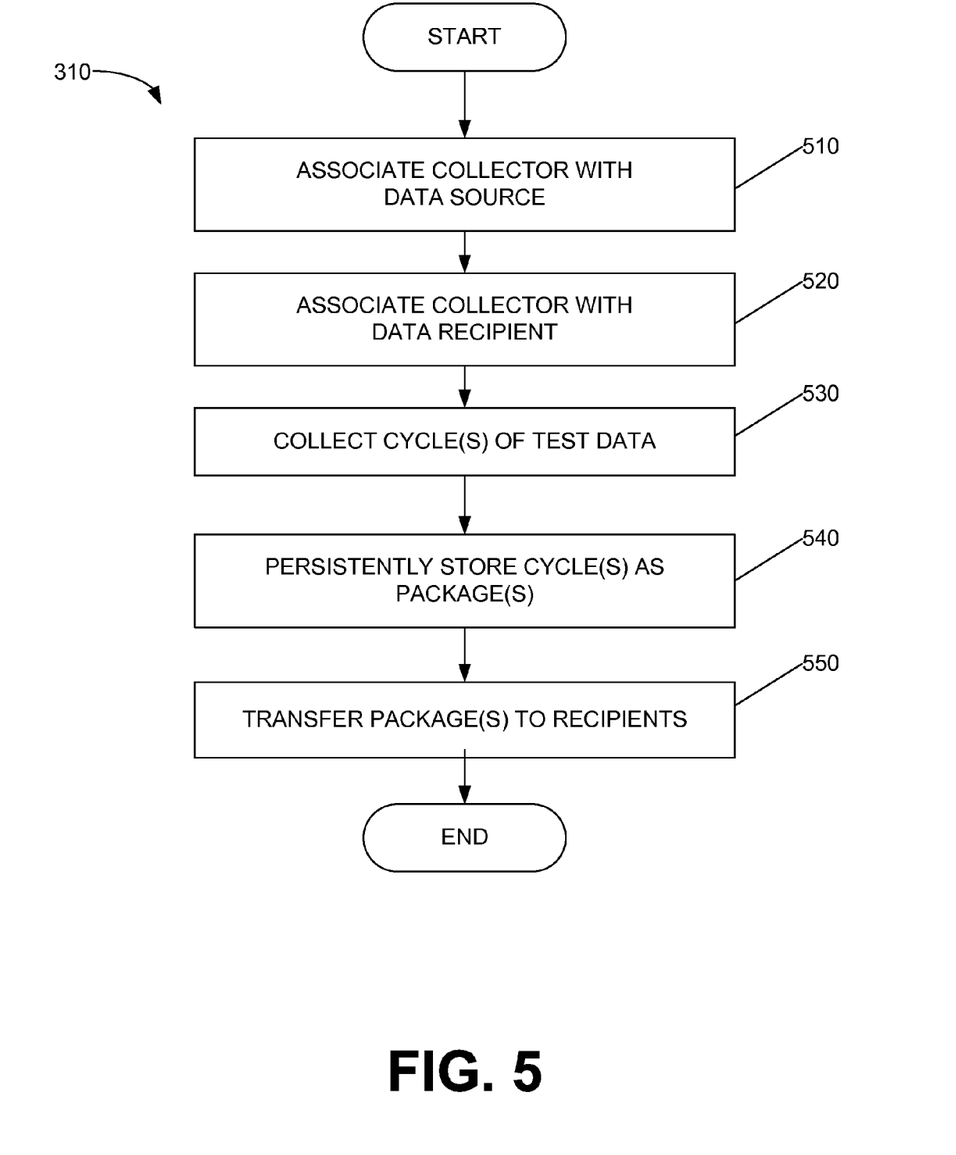
FIG. 5 is a flowchart describing operation of a portion of the data collector of FIG. 1, according to some embodiments disclosed herein.

FIG. 5 is a flowchart describing operation of collector 310. The process begins at block 510, where collector 310 is associated with one or more monitoring data sources 315. This association is stored as configuration data, and may be user-configurable. Next, at block 520, collector 310 is associated with one or more monitored data recipients, for example, monitors 305.

At block 530, data collector collects a cycle of monitored data 140 from each of the sources of monitored data. Though the collection is described as occurring in a single block 540, these collection cycles can occur at different times, and have different periods. At block 540, data collector persistently stores each of the cycles of monitored data 140 in a separate monitored data package 320. Though the storage is described as occurring in a single block 550, each monitored data package 320 can be stored at a different time.

Finally, at block 550, the data collector provides the monitored data packages 320 to the associated monitored data recipients. Notably, the monitored data packages 320 are provided in a manner that is asynchronous to the collection of the monitored data packages 320. The process of FIG. 5 is complete.

Figure 6:
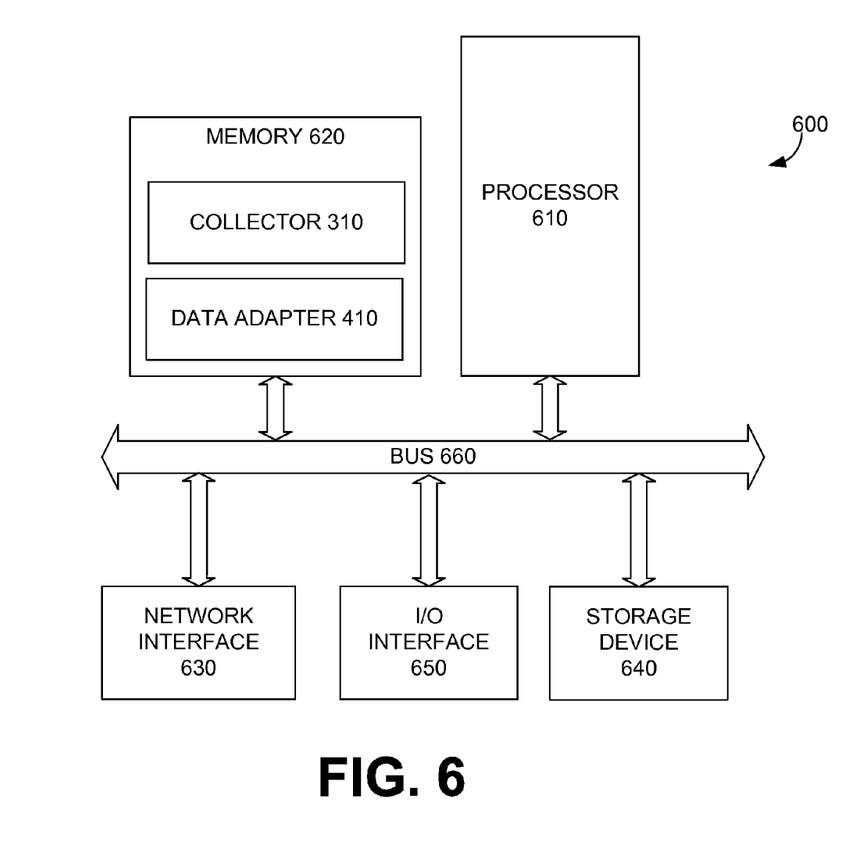
FIG. 6 is a block diagram of a computing device which can be used to implement the data collector of FIG. 1, according to some embodiments disclosed herein.

FIG. 6 is a block diagram of a computing device 600 on which the various components of APM system 110 and ECM system 105 can execute. Computing device 600 includes a processor 610, memory 620, a network interface 630, a storage device 640 (e.g., non-volatile memory or a disk drive), and one or more input output (I/O) interfaces 650. These hardware components are coupled via a bus 660. Omitted from FIG. 6 are a number of components that are unnecessary to explain the operation of APM system 110 and ECM system 105.

The various components of APM system 110 can be implemented in software (i.e., instructions executing on processor 610). FIG. 6 depicts a software implementation, with memory 620 used to store collector 310 and data adapter 410. Any or all of these components can also be implemented in specialized hardware logic. Hardware implementations include (but are not limited to) a programmable logic device (PLD), programmable gate array (PGA), field programmable gate array (FPGA), an application-specific integrated circuit (ASIC), a system on chip (SoC), and a system in package (SiP). These components may be implemented using any combination of hardware and software, as should be appreciated.

In some embodiments of APM system 110, one or more of the software-implemented components are stored on a computer-readable medium, which in the context of this disclosure refers to any structure which can contain, store, or embody instructions executable by a processor. The computer readable medium can be, for example, based on electronic, magnetic, optical, electromagnetic, infrared, or semiconductor technology. Specific examples of a computer-readable medium using electronic technology include (but are not limited to) the following: a random access memory (RAM); a read-only memory (ROM); and an erasable programmable read-only memory (EPROM or Flash memory). A specific example using magnetic technology includes (but is not limited to) a disk drive; and a portable computer diskette. Specific examples using optical technology include (but are not limited to) a compact disk read-only memory (CD-ROM) or a digital video disk read-only memory (DVD-ROM).

Any process descriptions or blocks in flowcharts would be understood as representing modules, segments, or portions of code which include one or more executable instructions for implementing specific functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The above description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

At least the following is claimed:

1. A method comprising:
    associating a data collector with a plurality of sources of monitored data, each respective source of monitored data associated with a corresponding monitored component;
    associating the data collector with a plurality of monitored data recipients;
    collecting, by the data collector, a cycle of monitored data from each source of monitored data;
    persistently storing, by the data collector, each cycle of monitored data in a separate monitored data package;
    providing, by the data collector, the monitored data packages to the associated monitored data recipients in a manner that is asynchronous to the collection of the monitored data.

2. The method of claim 1, wherein the data collector is centrally administrable and remotely configurable.

3. The method of claim 1, wherein each of the sources of monitored data is identified by at least one of a name, a network address, a domain, a user name, and user credentials.

4. The method of claim 1, wherein at least one of the sources of monitored data corresponds to an enterprise content management (ECM) server.

5. The method of claim 1, wherein the providing further comprises:
    sending the monitored data packages to at least one of the associated monitored data recipients without a corresponding request from the at least one of the associated monitored data recipients.

6. The method of claim 1, wherein the providing further comprises:
    sending the monitored data packages to at least one of the associated monitored data recipients in response to a request from the at least one of the associated monitored data recipients.

7. The method of claim 1, wherein the providing is implemented as a web service.

8. The method of claim 1, further comprising:
    performing a monitoring action on at least one of the sources of monitored data that results in at least a portion of the monitored data.

9. A system comprising:
    at least one memory storing instructions thereon; and
    at least one processor configured by the instructions to implement:
        a plurality of monitors, each monitor configured to execute one or more tests on a corresponding enterprise content management (ECM) monitored component to produce monitored data;
        a data collector associated with the plurality of monitors and configured to collect, from each of the monitors, a cycle of the monitored data and to persistently store each cycle in a separate monitored data package; and
        a plurality of monitored data recipients associated with the data collector, wherein each of the monitored data recipients is further configured to retrieve a respective one of the monitored data packages from the data collector in manner that is asynchronous to the collection of the monitored data.

10. The system of claim 9, wherein at least one of the sources of monitored data corresponds to an enterprise content management (ECM) server.

11. The system of claim 9, wherein the monitored data package comprises an eXtensible Markup Language (XML) file.

12. The system of claim 9, further comprising an evaluation module configured to evaluate data in the monitored data package and to produce an alert when triggered by the evaluation.

13. The system of claim 9, wherein an initial one of the collection cycles uses a random start time.

14. A system comprising:
    memory storing instructions thereon; and
    a processor configured by the instructions to implement:
        a data collector associated with a plurality of sources of monitored data, each of the sources of monitored data referencing a monitored data category;
        a plurality of monitored data recipients associated with the data collector; and
        wherein the data collector is configured to collect, from each of the sources of monitored data, a cycle of monitored data, wherein the collected cycle of monitored data is specific to the monitored data category referenced in the respective source of monitored data;
        wherein the data collector is further configured to persistently store the collected monitored data in separate monitored data packages, each monitored data package specific to the monitored data category identified in the corresponding source of monitored data;
        wherein each of the monitors is further configured to retrieve one or more of the monitored data packages in manner that is asynchronous to the collection of the monitored data.

15. The system of claim 14, wherein the associations between the data collector and the sources of monitored data are stored at the data collector.

16. The system of claim 14, wherein the associations between the data collector and the sources of monitored data are stored remotely from the data collector.

17. The system of claim 14, wherein an initial one of the collection cycles uses a random start time.

18. The system of claim 14, wherein the data collector remains logged in to at least one of the sources of monitored data between collection cycles.

19. The system of claim 14, further comprising:
    a module configured to execute one or more tests that produce the monitored data.

20. The system of claim 14, further comprising an evaluation module configured to evaluate data in the monitored data package and to produce an alert when triggered by the evaluation.

* * * * *